Feb. 1, 1949.  T. B. SILER  2,460,541
FOOTBALL CARD GAME
Filed Jan. 30, 1946  3 Sheets-Sheet 1

INVENTOR
T. B. SILER
BY
ATTORNEY

Feb. 1, 1949.   T. B. SILER   2,460,541
FOOTBALL CARD GAME
Filed Jan. 30, 1946   3 Sheets-Sheet 2
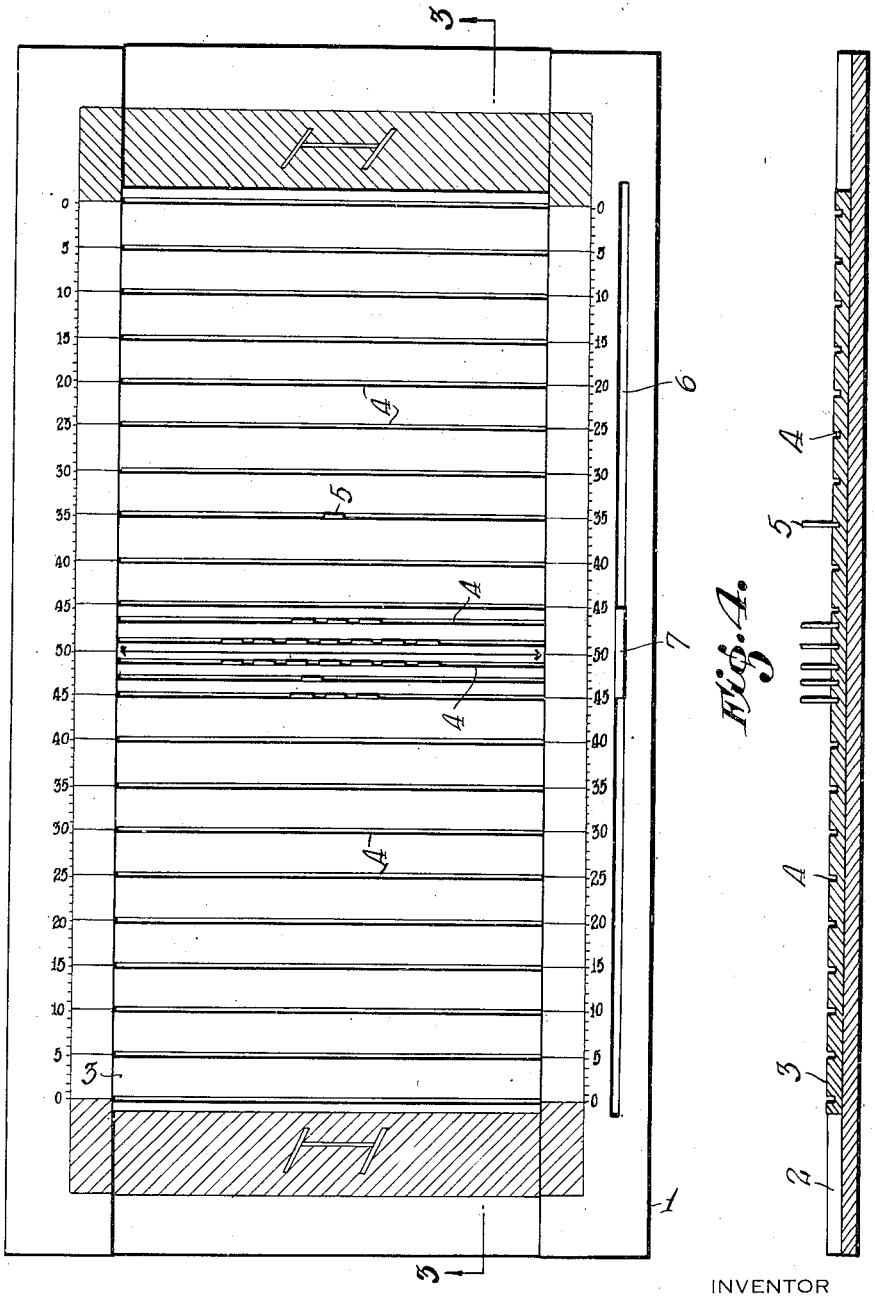
INVENTOR
T. B. SILER
BY
ATTORNEY Feb. 1, 1949.  T. B. SILER  2,460,541
FOOTBALL CARD GAME Filed Jan. 30, 1946  3 Sheets-Sheet 3

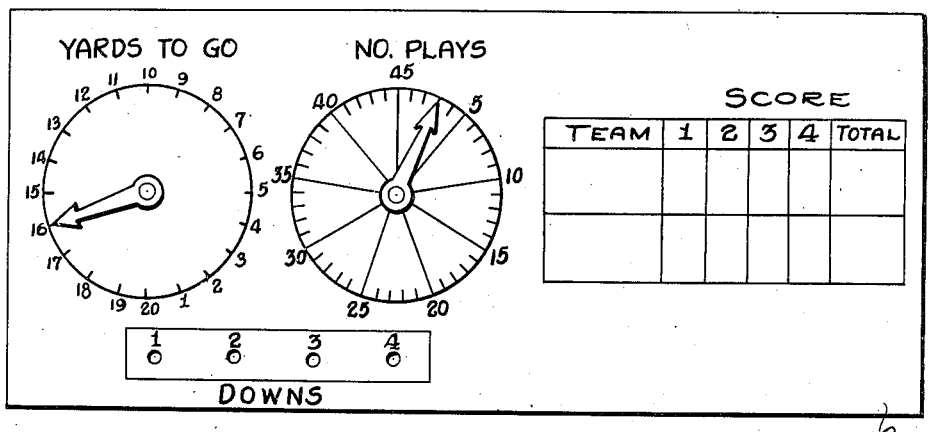

Fig. 5.

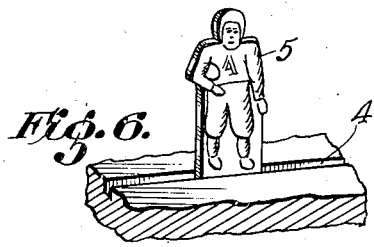

Fig. 6.

Fig. 7.

```
KICK OFF:  55          K.O. RETURN:  8
PUNT:      50          PUNT RETURN:  15
PUNT O.B.  25          QUICK KICK:   45R
LINE BUCK  T3          END RUN:      7
LONG PASS INCOMPLETE 26  LATERAL PASS: NO GAIN
SHORT PASS COMPLETE 15   POINT AFTER:  GOOD
RUN AFTER COMPLETION 0   FIELD GOAL:   LOW
FUMBLE: RECOVERED        PENALTY: OFFSIDE PLUS 5
BLOCKED KICK: RECOVERED
              #51
```

```
KICK OFF:  35          K.O. RETURN:  15
PUNT:      30          PUNT RETURN:  10
PUNT O.B.  30          QUICK KICK BLOCKED -5
LINE BUCK: G MINUS 2   END RUN: -6 (PENALTY)
LONG PASS: COMPLETE 16 LATERAL PASS: 3
SHORT PASS: COMPLETE 2 POINT AFTER: BLOCKED
RUN AFTER COMPLETION 25 FIELD GOAL: GOOD % OR WITHIN 15
FUMBLE: LOST            PENALTY: OFFSIDE PLUS 5
BLOCKED KICK: LOST
              #14
```

Fig. 8.

INVENTOR
T. B. SILER
BY
*R. Hanks Brett*
ATTORNEY

Patented Feb. 1, 1949

2,460,541

UNITED STATES PATENT OFFICE 2,460,541

FOOTBALL CARD GAME

Thomas Barton Siler, Atlanta, Ga.

Application January 30, 1946, Serial No. 644,398

6 Claims. (Cl. 273—94)

This invention relates to an amusement device and particularly to a game apparatus of the character of a football game.

One of the objects of this invention is the provision of a graph or chart simulating the conventional football field, and a plurality of cards or similar units provided with various legends indicating various football plays.

Another object of this invention is the provision of a chart simulating a conventional football field and upon which a game may be played with cards inscribed with various football plays and an indicator is movable upon said chart and adapted to record the progress or retrogression of the game with respect to each team.

A further object of this invention is the provision of a chart simulating the conventional football field and being provided with a slot into which is disposed a grooved board also simulating a portion of said field and which is adapted to be actuated in said slot. The grooves in said board are respectively adapted to accommodate and position players in various football formations desired by the contestants of each team.

Figure 1:
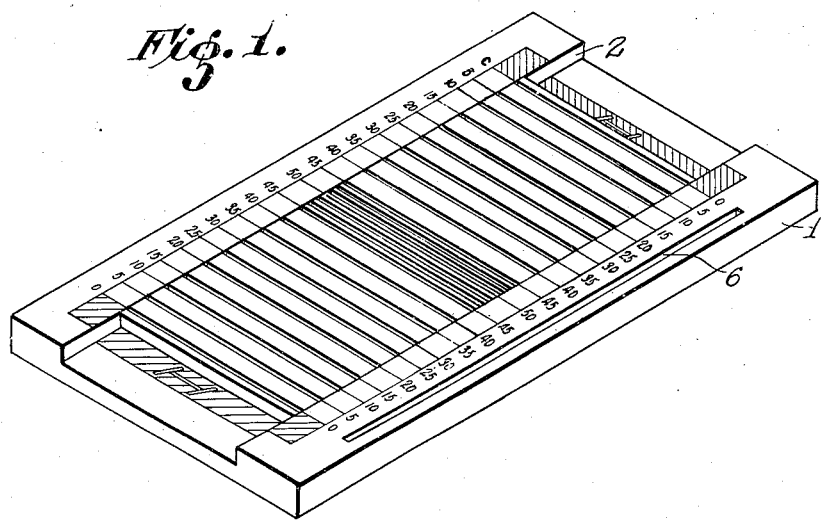
Figure 2:
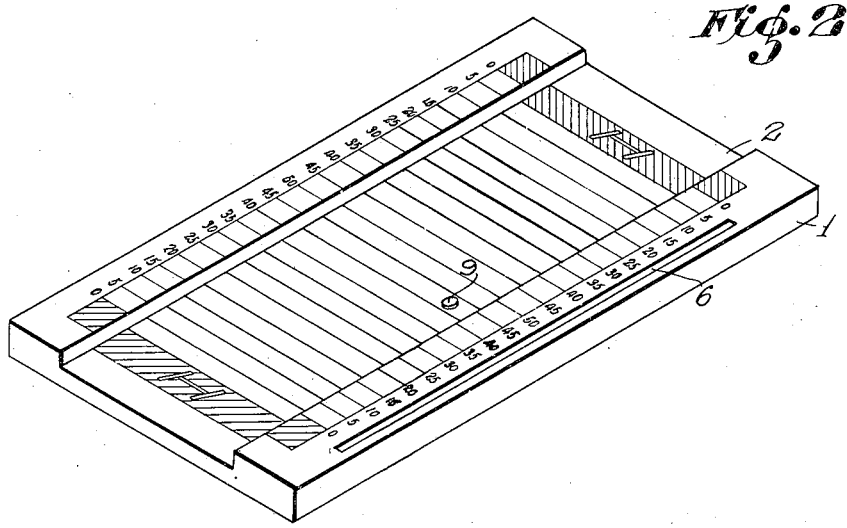

Other objects and features will more fully appear from the following description and accompanying drawings in which: Fig. 1 is a perspective view showing the chart and movable board; Fig. 2 is a view similar to that of Fig. 1 but with the board removed; Fig. 3 is a top plan view of the chart and board; Fig. 4 is a sectional view taken through lines 3—3 of Fig. 3, and perceiving in the direction of the arrows; Fig. 5 is a view of the score board; Fig. 6 is a view of a football player disposed in a groove of said board; and Figs. 7 and 8 are views of cards showing legends.

Referring to the drawings a chart 1 consists of a flat member having designed on the face thereof a conventional football field. A slot 2 is disposed in the chart and adapted to accommodate a board 3 graduated in similar fashion to the present day football field. The graduations on said board consist of grooves 4 which serve to accommodate players 5 as well as graduate the playing field. On either side of the fifty yard line (Fig. 3) a plurality of grooves are disposed in close proximity thereto so as to provide means whereby the opposing teams may adopt any desired team formation.

A track 6 is disposed in the chart alongside the graduated field and is provided with a marker 7 which is movable in said track and utilized to record the movement of the football and other such plays as are well known in the art of football.

A score board 8 is provided with means for keeping the score, tallying the yardage and downs and recording the number of plays; all of which is self-evident in Fig. 5, except the game may be played by the element of time, as now practiced in the usual football game; or by a given number of plays; in which latter case the circle designated: "No. plays" is used as a substitute for the time element. In other words, the football game is played in four quarters of fifteen minutes each, and applicant provides a substitute for the time element by counting so many plays to a quarter, as for instance, when forty-five plays are completed, this constitutes a quarter of the game.

The players (see Fig. 6) may be marked to designate different well known football teams such as "A" for Army and "N" for Navy and may also have individual player's names inscribed thereon.

The preferred form of the game requires that a plurality of cards or similar units be employed in playing the game. In the present game sixty cards are used. Applicant has disclosed two of such cards respectively numbered 51 and 14 for particular identification and fully disclosed in Figs. 7 and 8. As is obvious, the cards have a plurality of legends thereon; but it is to be noted that such legends are constant and are arranged in a vertical column or series. For instance, the constant legends on all cards (see cards 51 and 14 in Figs. 7 and 8) are: Kick off, Punt, Punt O. B., Line buck, Long pass, Short pass, Run after completion, Fumble, Blocked kick, K. O. Return, Punt return, Quick kick, End run, Lateral pass, Point after, Field goal and penalty. While all cards bear the aforesaid constant legends the answers are set beside each legend and respectively in horizontal alignment therewith and said answers are or may be varied. For instance, the constant legend: "Kick off" may have the numeral 55 beside it on one card while another card may have the numeral 35, each respectively indicating the number of yards the ball was kicked. Similarly the legend: Punt O. B. (out of bounds) may show on one card 25 while another card 30, meaning the ball was punted 25 or 30 yards out of bounds, as the case may be.

The game may be played by tossing a coin and the side winning the "tossup" may elect to kick the ball or receive it. If the grooved board 3 is used the players are placed in the usual kick off formation and thereafter may be replaced in scrimmage position; all of which is well known to the art. However, if the board is not used it may be removed and an indicator 9 utilized to indicate the movement of the football.

Let it be assumed that the board is being utilized and the winning side elects to kick. In such a case the other side shuffles the cards and places them in deck fashion face down. The side receiving the "kick off" takes the top card and perceives the legend: "Kick off 55" which indicates that the ball was kicked down the field from the kicker's 40 yard line a distance of 35 yards. The receivers having thus received the kick turn the next card and in accordance with the rules of the game look at the legend: "K. O. return 8"; (kick off returned 8 yards); which means the ball is returned 8 yards from the point received.

With the foregoing plays in mind, if the ball was kicked from the kicker's 40 yard line a distance of 35 yards the receiver would take the ball on his 25 yard line and return it a distance of 8 yards which would put the ball on the receiver's 33 yard line. By sliding the board to the receiver's 33 yard line the teams are in position for the next play.

The team with the ball now on its 33 yard line must progress ten yards in four attempts to make a first down; thus entitling them to another four downs. Meanwhile a peg is placed in "Downs" on the score board to show it is the first down and ten yards to go; while the hand is moved to the second graduation to show the number of plays (if this is substituted in place of time) consumed in the first quarter. The marker 7 is placed on the 33 yards line and extends to the 43 yard mark.

It will now be readily understood that I have provided a very compact and convenient assemblage of chart 1 and board 3. The board 3 is slidably located in the slot or valley 2 and is guided by the raised marginal portions of chart 1. The raised portions constitute guides for the slidable board. Since the board 3 is preferably no thicker than the valley 2 is deep it will be most apparent that I have produced a very compact assemblage of chart and board.

In the chart 1 the floor of the valley 2 is substantially as thick as the valley is deep.

On the board 3 the more nearly centrally located grooves 4, intermediate the ends of the board, are closer together than the major number of the grooves. These closely arranged grooves provide for a closer assemblage of the players than would be otherwise possible. Such a close assemblage of players probably would be desired, especially, initially when the game is about to start. The closely arranged grooves provide a broader range of selective choice of position for the players of the respectively opposing teams.

When the chart 1 and board 3 are assembled it is preferable that the grooved face of the board 3 be coplanar with the faces of the raised portions, since the raised portions carry indicia and lines which correspond, in yardage value, to the major number of the grooves 4.

The chart per se is shown in Fig. 2 and represents a football field or gridiron having the yardage lines and yardage values and goal posts marked or indicated thereon. Figs. 1, 3 and 4 disclose both the chart and the grooved slidable board 3.

The team with the ball, before turning the next card, elects to line buck and takes the next card and perceives the legend: "Line buck T3" which means the ball carrier went through the tackle player's position for a gain of three yards. The peg in the score board is placed in the second hole, indicating second down, the hand on yards to go is placed at 7, meaning there are seven yards to be made in the remaining three downs, while the hand on "No. plays" is moved to the third point leaving 42 more plays left before end of the quarter. Assuming the same play (line buck) would have read: "Line buck-fumbled" then the player would take the next card from the deck and perceive the legend "Fumble" and it would tell whether it was lost or recovered. The same rule is applicable to the legend: "Punt." Thus if the player decides to punt, he lifts the top card from the deck and refers to the legend: "Punt" which may have thereafter "Blocked kick—lost," or it may have "Blocked kick—recovered."

The foregoing described plays is the manner in which the game is played and when 45 plays have been made this ends the first quarter and the teams reverse their positions on the field, and proceed to make the next 45 plays which ends at the half.

The players may be named, as aforesaid, and if a team desires to kick and has a well known kicker, it may take out a player and substitute the good kicker; thus making the game more realistic.

It is obvious from the foregoing that the constant legends have varied resultant plays which are used in the present football game.

As heretofore pointed out, the board 3 may be removed and the chart also simulates a football field; the main purpose of the board is to contain the players and move them along the field; which provides a more realistic game. As the board moves the teams along the field the marker 7 is moved along track 6 to check the yardage. However, when the board is removed, indicator 9 is used in its place.

It is to be understood that additional constant legends may be added and various answers to such legends be made which is in keeping with the well known game of football.

Having described this invention, what is claimed is:

1. In a simulated football game comprising a rectangular chart, said chart being comparatively rigid and having raised marginal portions comprising marginal zones constituting guides, said chart and its marginal portions defining a broad rectangular valley between said marginal portions, said marginal portions and said valley having lines thereon arranged transversely thereof, said lines on said valley and on said marginal portions being substantially and respectively in alignment with each other, said lines being substantially parallel and suitably spaced from each other substantially equal distances, said marginal portions having indicia thereon to indicate the relative yardage of spaces and lines on said chart, in combination with a rectangular board, said board being as wide as said valley and being located in said rectangular valley and slidably guided by said raised marginal portions, said board having transverse grooves therein to detachably receive and support players in an upright position when placed therein, the major number of said grooves being equally spaced but centrally located grooves being more closely spaced to provide, if desired, a closely arranged disposition of the players, especially in the initial portion of the game.

2. The construction set forth in claim 1, in which said board is substantially thin and compact, being uniformly and substantially no thicker than said valley is deep.

3. In a simulated football game, comprising a comparatively rigid chart, said chart having oppositely disposed raised marginal portions, said maginal portions constituting opposed guides and defining a broad rectangular valley therebetween, said valley and marginal portions having transversely arranged lines thereon defining respectively substantially equal areas whereby all of said individual lines are respectively located substantially in alignment with each other and thereby defining a football field, said marginal portions having indicia thereon to indicate the yardage value of the football field, in combination with a rectangular board as wide as said valley and slidably fitted in the valley of said chart and slidably guided by said opposed guides, said board having transversely arranged grooves located therein, the major number of said grooves being substantially parallel and substantially equally spaced from each other but the centrally arranged grooves being more closely arranged than the major number of said grooves, whereby the players, if desired, may be closely arranged in the initial portion of the game.

4. The construction set forth in claim 3 in which said combined chart and board represents a compact assemblage wherein said board is substantially and uniformly no thicker than said valley is deep.

5. The construction set forth in claim 3 in which said combined chart and board represents a compact assemblage wherein the exposed top surface portion of said board is coplanar with the raised surface portions of said chart.

6. The construction set forth in claim 3 in which said chart is provided with a comparatively thin floor below its valley, said floor being substantially no thicker than said valley is deep.

THOMAS BARTON SILER.

REFERENCES CITED

The following references are of record in the file of this patent:

UNITED STATES PATENTS

| Number | Name | Date |
| --- | --- | --- |
| 817,191 | Robinson | Apr. 10, 1906 |
| 1,138,678 | McNair | May 11, 1915 |
| 1,331,196 | Hart | Feb. 17, 1920 |
| 1,905,303 | Potter | Apr. 25, 1933 |
| 1,923,607 | Barringer | Aug. 22, 1933 |
| 2,084,802 | Hamilton et al. | June 22, 1937 |

FOREIGN PATENTS

| Number | Country | Date |
| --- | --- | --- |
| 248,278 | Great Britain | Mar. 4, 1926 |